No. 765,904. PATENTED JULY 26, 1904.
J. W. A. RICHARDSON.
SYSTEM OF HOUSE WIRING.
APPLICATION FILED MAR. 14, 1904.
NO MODEL. 3 SHEETS—SHEET 1.
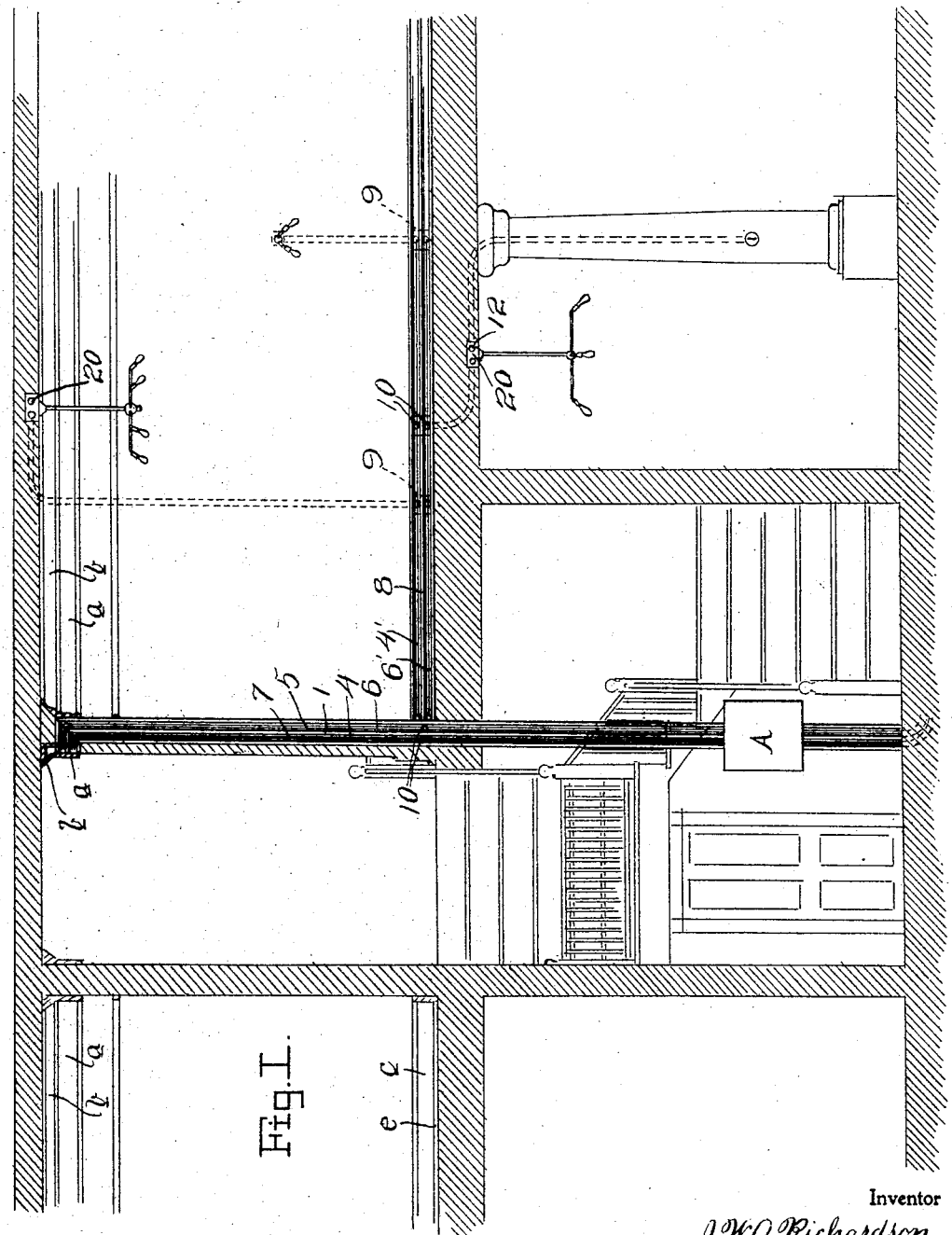
Fig. I.
Witnesses
Inventor
J. W. A. Richardson.
By 
Attorney

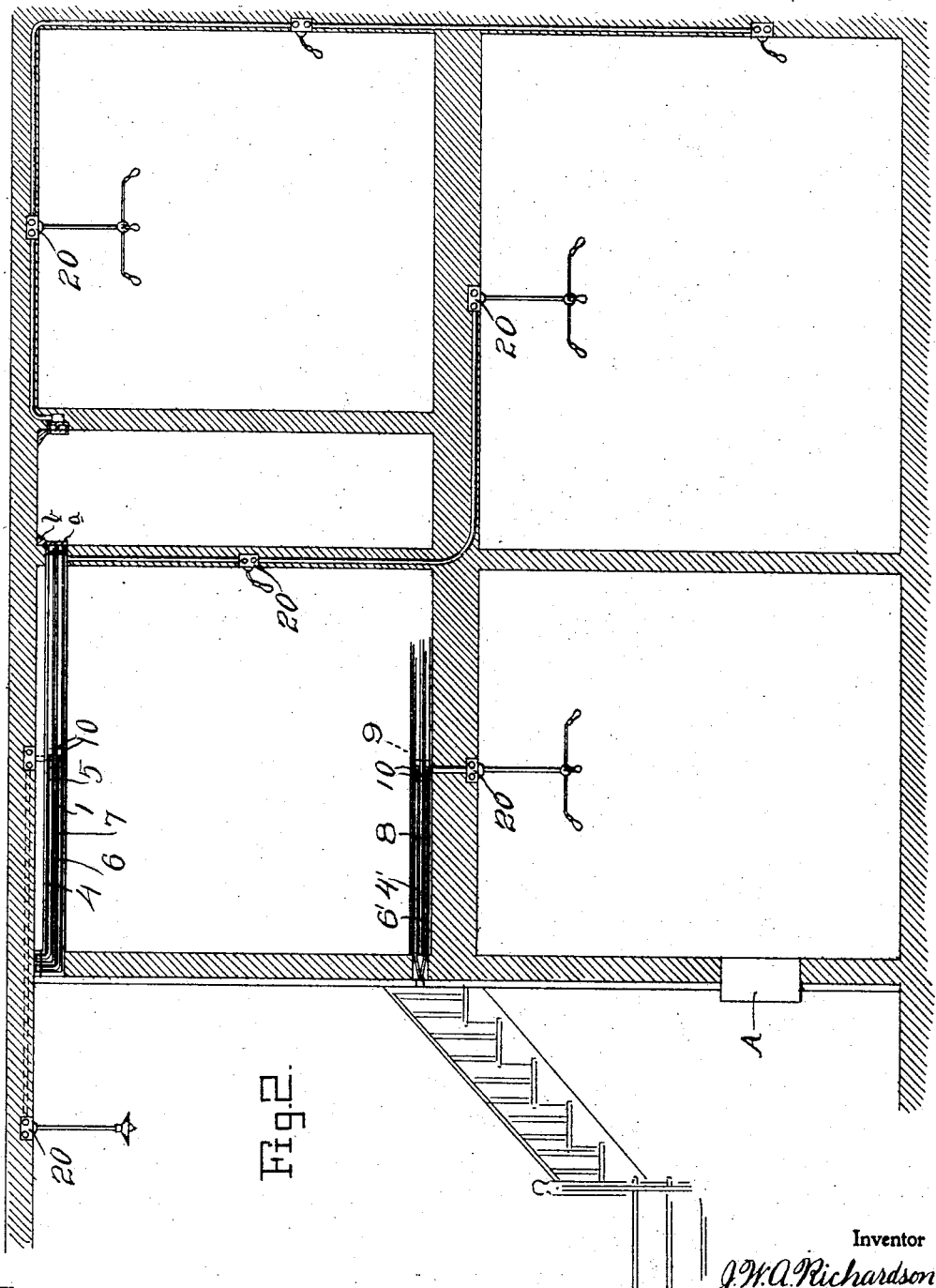

No. 765,904. PATENTED JULY 26, 1904.
J. W. A. RICHARDSON.
SYSTEM OF HOUSE WIRING.
APPLICATION FILED MAR. 14, 1904.
NO MODEL. 3 SHEETS—SHEET 3.

Witnesses
C. R. Reichenbach
J. U. Willson

Inventor
J. W. A. Richardson

By H. B. Willson
Attorney

No. 765,904. Patented July 26, 1904.

UNITED STATES PATENT OFFICE.

JOSEPH W. A. RICHARDSON, OF NEW ORLEANS, LOUISIANA.

SYSTEM OF HOUSE-WIRING.

SPECIFICATION forming part of Letters Patent No. 765,904, dated July 26, 1904.

Application filed March 14, 1904. Serial No. 198,132. (No model.)

*To all whom it may concern:*

Be it known that I, JOSEPH W. A. RICHARDSON, a citizen of the United States, residing at New Orleans, in the parish of Orleans and State of Louisiana, have invented certain new and useful Improvements in Systems of House-Wiring; and I do declare the following to be a full, clear, and exact description of the invention, such as will enable others skilled in the art to which it appertains to make and use the same.

This invention relates to improvements in house-wiring systems.

The object of the invention is to provide a system or arrangement of main-wire conduits so constructed as to be invisible, but in which ready access may be had to any part of the wires contained therein.

Another object is to provide an arrangement of outlet or distributing boxes in connection with said main-wire conduits from which branch-wire conduits may be run in any direction to side or ceiling brackets, switches, or other points of service.

A further object is to provide a main-wire conduit in which separate passages are provided for positive and negative wires and, if desired, an additional passage for low-potential wires, such as telephone, bell, or signal wires.

Still another object is to provide a system of distribution or arrangement of main and branch wire conduits and outlet or distribution boxes which will materially reduce the cost of installing the same either in houses already constructed or in the course of construction.

With these and other objects in view the invention consists of certain novel features of construction, combination, and arrangement of parts, as will be more fully described, and particularly pointed out in the appended claims.

Figure 5:
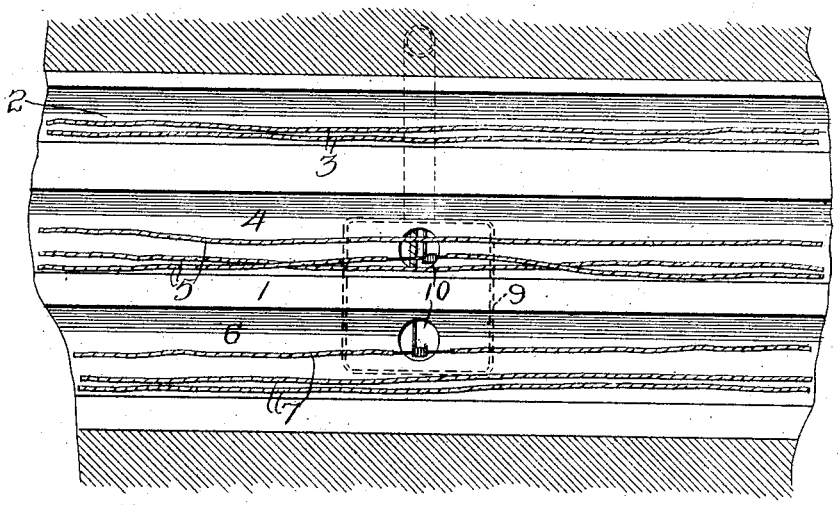
Figure 3:
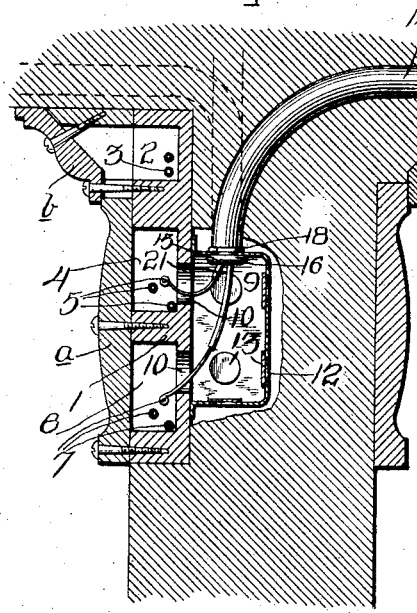
Figure 4:
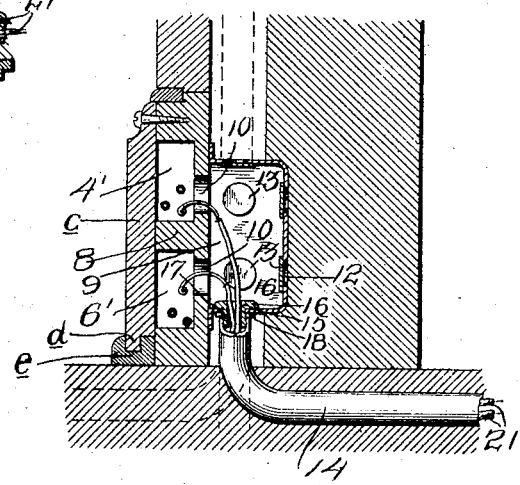

In the accompanying drawings, Figure 1 is a diagrammatic sectional view through a portion of a house, showing the general arrangement of the conduits and distribution-boxes. Fig. 2 is a similar sectional view taken at right angles to Fig. 1. Fig. 3 is an enlarged detail sectional view through the conduits and a distributing-box, showing the arrangement of the parts at the juncture of the side wall and ceiling; and Fig. 4 is a similar view showing the construction and arrangement of the parts at the base of the side walls adjacent to the floor. Fig. 5 is a front elevation of the conduit shown in Fig. 3 with the cover-piece removed, showing how access may be had to the wires.

Referring now more particularly to the drawings, 1 denotes a strip which is arranged at the top of the side walls of a room adjacent to the ceiling. In the face of the strip is formed a series of longitudinal passages or channels, forming conduits in which are disposed the main wires of the system. In the passage 2 at the upper edge of the strip is arranged all low-potential wires 3, such as telephone, signal, or bell wires. In the passages or conduits 4 are arranged all positive wires 5, and in the conduits 6 are arranged all negative wires 7 of the lighting-circuit of the system, so that the wires of each class are separated from those of the other in channels or passages of their own, and as many circuit-wires as desired may be arranged in the conduits.

On the outer face of the strip 1 are arranged covering-strips *a* and *b*, which are adapted to be removably secured to the strips 1 by screws or otherwise to cover the passages therein. The cover-strips *a* are arranged to cover the passages in which are disposed the light-circuit wires, while the cover-strips *b* are arranged to cover the passage in which are disposed the low-potential wires. These cover-strips are arranged so that either may be removed independently and without disturbing the other, thus permitting access to either the high or the low potential wires without uncovering the other.

At the base of the side walls adjacent to the floor are arranged strips 8, in which are formed passages or conduits 4' and 6', in which are disposed the positive and negative wires of other light or high-potential circuits.

On the outer face of the strips 8 is removably secured cover-strips *c*, the lower edges of which are rabbeted, as at *d*, to enter a grooved retaining-strip *e*, secured to the floor or to the base of the strip 8. This grooved strip serves not only to retain the cover-strips *c*, but also to prevent the entrance of water into the passages or conduits of the strips 8.

The base-strip 8 and the cover-strip *c* of the same are adapted to take the place of the ordinary mop-board, while the ceiling-strips and covers *a* and *b* of the same form an ornamental cornice for the room.

The passages or conduits in the strips 1 and 8 are coated with asbestos or with fireproof paint and are of sufficient size to accommodate a number of circuit-wires.

At a convenient place in the house, but preferably in the hallway, as shown, is arranged a switch-cabinet A, to which the terminals of the outside supply-wires are brought after entering the building and from which all the conduits for the main wires in the building extend and where any or all of said main wires may be switched onto or connected to said supply-wires.

At such points in the conduit-strips as may be desired are arranged outlet or distributing boxes 9, which are preferably rectangular in shape and formed of metal. These boxes are secured to the inner sides of the strips 1 and 8 by screws or other fastening means and project into recesses in the walls or between the thicknesses of the same. In the said strips 1 and 8 in front of each box are formed openings 10, which communicate with the boxes, as shown in Figs. 3 and 4.

In each side of the boxes 9 are formed openings 12, with which are adapted to be connected the ends of branch conduits 14. Such of the holes 12 as are not connected with the conduits 14 are closed by removable plates 13. The ends of the conduits 14 may be connected with the holes in the boxes in any suitable manner, but are here shown as connected by providing an apertured plug 15, having a head 16 and a threaded stem 17. The stem of the plug is adapted to be passed through one of the holes 12 in the box, with the head of the same engaging the inner wall of the box. A jam-nut 18 is then screwed onto the threaded shank against the outer wall of the box, thereby securing the plug in place. The ends of the conduits are interiorly threaded, and into said threaded ends are screwed the threaded stems of the plugs, thereby connecting the branch conduits with the boxes.

The branch conduits 14 are preferably in the form of tubes and are constructed of metal or other suitable material and may be run in any direction through the walls either between the thicknesses of the same or embedded in the plaster. These conduits extend from the outlet or distributing boxes 9 to such places in the ceiling or side walls of the room where it is desired to use the current and where said conduits are adapted to connect with auxiliary outlet-boxes 20, which are similar in construction to the outlet-boxes 9, and to the boxes 20 are connected the side brackets and ceiling-chandeliers for the lights. Through the branch conduits 14 are run the feed-wires 21, which enter the boxes 9 at one end and are passed through the openings 10 in the rear walls of the strips and are connected with the positive and negative wires of the main line. The opposite ends of the feed-wires enter the boxes 20, where they are connected with the chandelier or bracket wires (not shown) or with a switch.

In an arrangement of main and branch conduits and distributing-boxes as is herein shown and described it will be seen that a system of wiring is provided by which high and low potential conductors may be run in separate passages to any part of a building and the current distributed from the same to such places where it is desired for use.

The arrangement as herein described also permits ready access to any part of the wires, so that repairs may be easily made to the same. Furthermore, the construction described permits the use of the system in non-fireproof as well as fireproof buildings, and in installing the same in completed buildings it is not necessary to disfigure or injure the walls, and after the parts are in place the same may be decorated to conform with the color scheme of the rooms and will afford an ornament for the same.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

1. In house-wiring systems of electrical conductors, the combination with main-wire-conduit strips, of separated passages arranged in said strips for positive and negative wires, means for covering said passages, distributing-boxes connected to the inner sides of said strips, outlet-holes formed in said strips and connecting with said boxes, branch or feed wire conduits communicating with said boxes and means for connecting the ends of said conduits with said boxes, substantially as described.

2. In house-wiring systems of electrical conductors, the combination with ceiling and base main-wire-conduit strips of separated passages or conduits arranged in said strips in which are disposed the positive and negative wires of light or other high-potential circuits and a conduit for low-potential wires, independently-removable cover-strips for the passages of said high-potential circuits, and said low-potential circuits, distributing-boxes secured to the inner side of said conduit-strips, and branch or feed wire conduits connected to said distributing-boxes whereby the current may be conducted to the ceiling-chandelier, or side brackets, lights, switches, or other places of use, substantially as described.

3. In house-wiring systems of electrical conductors, the combination with main-wire-conduit strips, of separated passages arranged in said strips for positive and negative wires, means for covering said passages, distributing-boxes connected to the inner sides of said strips, outlet-holes formed in said strips and connecting with said boxes, outlet-holes formed in said boxes, headed apertured plugs, having threaded stems arranged in said holes, jam-nuts screwed on said stems and against the outer wall of said box to hold said studs in place, branch or feed wire conduits adapted to be screwed onto the threaded stems of said plugs, whereby the same are connected to said boxes, and similarly arranged and connected distributing-boxes disposed at the opposite ends of said branch conduits, substantially as described.

4. In house-wiring systems of electrical conductors, the combination with ceiling and base main-wire-conduit strips, of separated passages or conduits arranged in said strips in which are disposed the positive and negative wires, of light or other high-potential circuits, and a conduit for low-potential wires, independently-removable cover-strips for the passages of said high-potential circuits and said low-potential circuits, means for preventing the entrance of water or the like into the conduits of said base-strips, distributing-boxes secured to the inner side of said conduit-strips, and branch or feed wire conduits connected to said distributing-boxes, substantially as described.

In testimony whereof I have hereunto set my hand in presence of two subscribing witnesses.

JOSEPH W. A. RICHARDSON.

Witnesses:
　WALTER M. GATES,
　ALFRED HAMMANN.